(12) United States Patent
Sankrithi et al.

(10) Patent No.: US 9,708,065 B2
(45) Date of Patent: Jul. 18, 2017

(54) CROWN CABIN CONFIGURATION FOR AN AIRCRAFT

(71) Applicant: The Boeing Company, Chicago, IL (US)

(72) Inventors: Mithra M. K. V. Sankrithi, Lake Forest Park, WA (US); Sergey D. Barmichev, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 14/680,978

(22) Filed: Apr. 7, 2015

(65) Prior Publication Data

US 2016/0297528 A1    Oct. 13, 2016

(51) Int. Cl.
| | | |
|---|---|---|
| *B64D 13/00* | (2006.01) | |
| *B64D 11/06* | (2006.01) | |
| *B64C 1/06* | (2006.01) | |
| *B64C 1/12* | (2006.01) | |
| *B64C 1/00* | (2006.01) | |

(52) U.S. Cl.
CPC ............ *B64D 11/0601* (2014.12); *B64C 1/00* (2013.01); *B64C 1/061* (2013.01); *B64C 1/064* (2013.01); *B64C 1/12* (2013.01); *B64C 2001/0027* (2013.01); *B64C 2001/0045* (2013.01); *Y02T 50/12* (2013.01); *Y02T 50/46* (2013.01)

(58) Field of Classification Search
CPC ... B64D 11/0601; B64C 1/0009; B64C 1/061; B64C 1/064; B64C 1/12; B64C 1/1484; B64F 5/0009
See application file for complete search history.

(56) References Cited

U.S. PATENT DOCUMENTS

| | | | | |
|---|---|---|---|---|
| 5,115,999 | A | * | 5/1992 | Buchsel .................... B64C 1/00 244/118.5 |
| 5,992,797 | A | | 11/1999 | Seidel et al. |
| 6,073,883 | A | | 6/2000 | Ohlmann et al. |
| 6,705,567 | B2 | * | 3/2004 | Dong ..................... B64C 30/00 244/117 R |
| 8,746,616 | B2 | | 6/2014 | Barmichev et al. |
| 8,794,569 | B1 | | 8/2014 | Ohlmann et al. |
| 8,899,520 | B2 | * | 12/2014 | Barmichev ............... B64C 1/00 244/119 |
| 9,090,357 | B2 | * | 7/2015 | Oberoi .................. B64F 5/0009 |
| 2003/0106962 | A1 | * | 6/2003 | Smallhorn ................ B64C 1/18 244/118.5 |
| 2005/0242641 | A1 | * | 11/2005 | Thompson ............... B60N 2/01 297/248 |
| 2007/0241235 | A1 | * | 10/2007 | Atchison ................ B64D 11/06 244/122 R |
| 2007/0267544 | A1 | * | 11/2007 | Linero ................... B64D 11/00 244/118.5 |
| 2008/0251641 | A1 | * | 10/2008 | Sprenger ................. B64C 1/068 244/118.5 |

(Continued)

*Primary Examiner* — Assres H Woldemaryam
(74) *Attorney, Agent, or Firm* — Ostrager Chong Flaherty & Broitman P.C.

(57) ABSTRACT

An aircraft configuration having a crown cabin above a main cabin, with the crown cabin having a hanging floor structure. This enables a fuselage design that substantially increases passenger seating capacity relative to traditional single-passenger-deck configurations, while minimizing fuselage perimeter and fuselage wetted area relative to double-passenger-deck configurations.

19 Claims, 17 Drawing Sheets

(56) References Cited

U.S. PATENT DOCUMENTS

| | | | |
|---|---|---|---|
| 2009/0072086 A1* | 3/2009 | Smith | B32B 3/12 244/119 |
| 2009/0272846 A1* | 11/2009 | Anast | B64C 1/068 244/120 |
| 2009/0294588 A1* | 12/2009 | Griess | B64C 1/068 244/121 |
| 2010/0223772 A1 | 9/2010 | Johnson et al. | |
| 2010/0252680 A1* | 10/2010 | Porter | B60N 2/01 244/118.6 |
| 2010/0295358 A1* | 11/2010 | Lee | B60N 2/46 297/411.2 |
| 2011/0001006 A1* | 1/2011 | Delahaye | B64F 5/0009 244/118.5 |
| 2011/0101161 A1* | 5/2011 | Saint-Jalmes | B64D 11/06 244/118.6 |
| 2012/0074259 A1* | 3/2012 | Demont | B64C 1/18 244/118.6 |
| 2012/0234968 A1* | 9/2012 | Smith | B64C 29/0033 244/12.3 |
| 2013/0119203 A1* | 5/2013 | Dupont | B64C 1/18 244/137.2 |
| 2013/0313368 A1 | 11/2013 | Munsen et al. | |
| 2013/0334368 A1* | 12/2013 | Sankrithi | B64C 1/20 244/118.1 |
| 2014/0209744 A1 | 7/2014 | Marcoe et al. | |
| 2014/0220372 A1 | 8/2014 | Heck et al. | |
| 2014/0283296 A1* | 9/2014 | Jerome | B60N 2/34 5/12.1 |

* cited by examiner

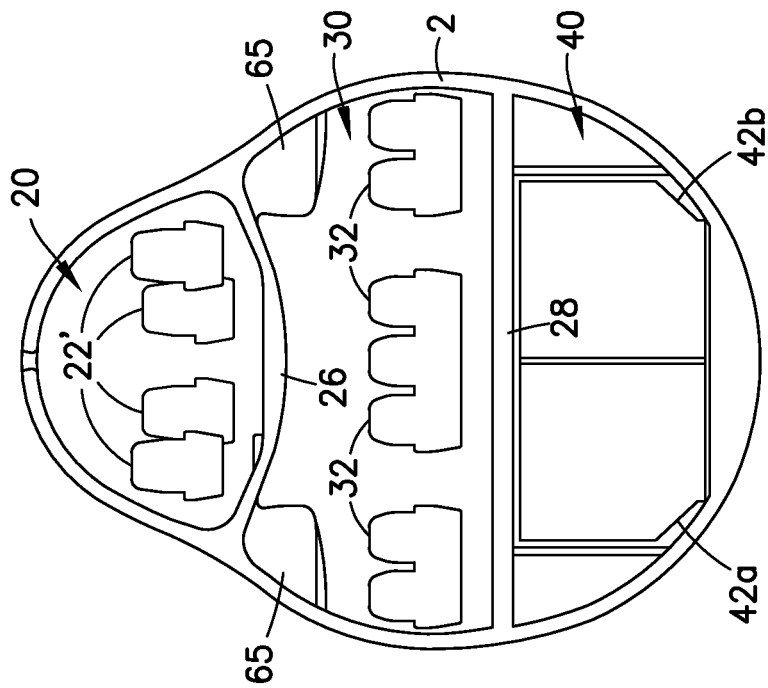
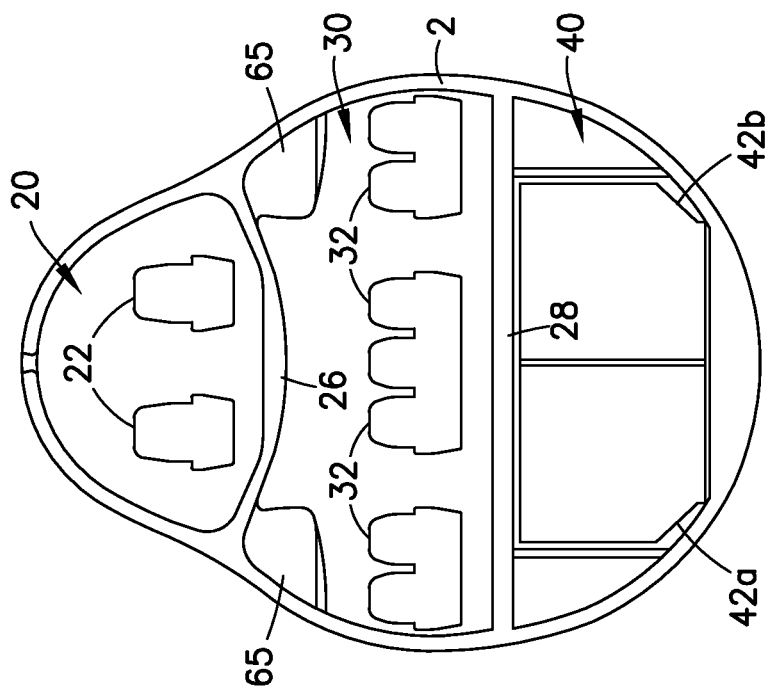

CROWN CABIN CONFIGURATION FOR AN AIRCRAFT

BACKGROUND

This disclosure generally relates to aircraft fuselage configurations and cabin layouts, and deals more particularly with aircraft fuselage configurations and cabin layouts for multi-deck aircraft having an upper passenger seating deck.

The profitability of an airline is directly related to the number of passengers and the amount of cargo-carrying space its planes are equipped to transport. The greater the passenger seating space, the greater the potential passenger revenues. Similarly, the greater the cargo-carrying space, the greater are the potential cargo revenues. Therefore, an airline can increase its profitability by increasing passenger seating space and cargo-carrying capability.

One method of increasing aircraft passenger seating and cargo space is to increase the length of the aircraft's fuselage. This process is commonly known as "stretching". There are a number of problems associated with stretching an aircraft, including a reduction in the aft body rotation clearance, disproportionate growth of the lower cargo space, a reduction in aircraft maneuverability in and around airports, and a reduction in the ability to park the aircraft in length-constrained airport gates.

A second method of increasing passenger space is to use a full-length main seating deck and an additional upper seating deck provided over the entire length of the fuselage, over a forward portion of the fuselage, or over an aft portion of the fuselage. Increasing passenger space by use of a forward, an aft, or a full upper deck is generally preferred to stretching an aircraft because the resulting aircraft is easier to maneuver at airports and is capable of larger rotation angles during takeoff and landing. Such a craft also has reduced fuselage wetted area per seat and hence reduced skin friction drag on a per seat basis.

There are a number of problems associated with attempting to design a viable full upper deck aircraft. One problem is that dual-deck aircraft have a fuselage perimeter and a fuselage wetted area which are non-optimal. Thus, full upper deck configurations typically suffer from relatively high levels of profile drag. As used herein, the term "profile drag" means the sum of form drag and skin friction drag.

In one design aspect, it is generally accepted that aircraft weight (without payload) and aerodynamic drag correlate with aircraft fuselage surface area and correspondingly with aircraft cross sectional perimeter. It is desirable to reduce both weight and aerodynamic drag because greater aircraft weight and/or drag reduces payload and/or range, and higher aerodynamic drag in flight translates into higher fuel usage, and also translates into higher carbon dioxide emissions, all other factors being equal. Aerodynamic drag increases as the lateral cross-sectional area increases because perimeter is related directly to cross-sectional area for a fuselage shape. However, the larger the aircraft lateral cross-sectional area, the more spacious the interior of the aircraft for passenger comfort. Accordingly, a balance must be struck between interior space (which translates to cross-sectional area) on the one hand and weight and aerodynamic drag on the other. With increasing fuel costs, reduction in aircraft fuselage perimeter and cross-sectional area is becoming more desirable.

There is a need for improved fuselage designs that substantially increase passenger seating capacity relative to traditional single-passenger-deck configurations, while minimizing fuselage perimeter and fuselage wetted area relative to double-passenger-deck configurations.

SUMMARY

The subject matter disclosed in detail below is directed to an aircraft configuration in which a fuselage comprising a semi-monocoque structure is subdivided by decks which form a crown cabin above a main cabin, both having passenger seats. The crown cabin is formed by an upper portion of the fuselage semi-monocoque structure and an upper deck in the form of a hanging floor structure attached to or integrally formed with the fuselage semi-monocoque structure. This enables a fuselage design that substantially increases passenger seating capacity relative to traditional single-passenger-deck configurations, while minimizing fuselage perimeter and fuselage wetted area relative to double-passenger-deck configurations. The installation of a hanging floor structure of a crown cabin may occur during the original construction of an aircraft or as part of a retrofitting process for an aircraft that lacks a crown cabin.

A semi-monocoque structure is defined as a structure having a load-carrying skin member as well as additional structural members such as one or more stiffeners, longerons, stringers, sandwich core, frames, ribs, bulkheads, isogrid members and orthogrid members. This definition is consistent with usage of semi-monocoque structures as applied to modern aircraft designs, while also including sandwich structures with outer and inner skins separated by a sandwich core. A semi-monocoque structure may comprise upper and lower semi-monocoque structures which are attached together to form a fuselage.

One aspect of the subject matter disclosed in detail hereinafter is an aircraft structure comprising: a fuselage comprising lower and upper semi-monocoque structures; a wing attached to the lower semi-monocoque structure; a propulsor mounted to the wing; a lower deck disposed inside the fuselage and attached to the lower semi-monocoque structure, the lower deck and the lower semi-monocoque structure defining a space for storing at least one of baggage, bulk cargo and containerized cargo; an upper deck disposed inside the fuselage above the lower deck and attached to or integrally formed with at least one of the upper and lower semi-monocoque structures, the upper and lower decks and the lower semi-monocoque structure defining a main cabin, and the upper deck and the upper semi-monocoque structure defining a crown cabin; a first multiplicity of passenger seats supported by the lower deck and disposed in the main cabin; and a second multiplicity of passenger seats supported by the upper deck and disposed in the crown cabin, wherein the upper deck has a hanging floor structure comprising a central portion extending along a length of the upper deck, a first angled portion connected to the central portion and attached to or integrally formed with the fuselage at an elevation which is higher than an upper surface of the central portion, and a second angled portion connected to the central portion and attached to or integrally formed with the fuselage at an elevation which is higher than the upper surface of the central portion of the upper deck, the central portion being structurally supported by the first and second angled portions. In accordance with some embodiments, the first and second angled portions of the hanging floor structure are attached to or integrally formed with the upper semi-monocoque structure. In accordance with other embodiments, the first and second angled portions of the hanging floor structure are attached to or integrally formed with the lower semi-monocoque structure. The crown cabin may comprise a longitudinal aisle with passenger seats disposed on both sides of the longitudinal aisle. Some of the passenger seats in the crown cabin may be horizontally and/or vertically staggered relative to each other.

Another aspect of the subject matter disclosed in detail hereinafter is an aircraft structure comprising: a fuselage comprising a semi-monocoque structure; a lower deck disposed inside the fuselage and attached to the semi-monocoque structure, the lower deck and the semi-monocoque structure defining a storage space; an upper deck disposed inside the fuselage above the lower deck and attached to or integrally formed with the semi-monocoque structure, the upper and lower decks and the semi-monocoque structure defining a main cabin, and the upper deck and the semi-monocoque structure defining a crown cabin; a first multiplicity of passenger seats supported by the lower deck and disposed in the main cabin; and a second multiplicity of passenger seats supported by the upper deck and disposed in the crown cabin, wherein the upper deck has a hanging floor structure comprising a central portion extending along a length of the upper deck, a first angled portion connected to the central portion and attached to or integrally formed with the semi-monocoque structure at an elevation which is higher than an upper surface of the central portion, and a second angled portion connected to the central portion and attached to or integrally formed with the semi-monocoque structure at an elevation which is higher than the upper surface of the central portion of the upper deck, the central portion being structurally supported by the first and second angled portions.

A further aspect of the subject matter disclosed in detail hereinafter is a method of retrofitting an aircraft having a main cabin for passengers inside a fuselage comprising an original semi-monocoque structure, the method comprising: (a) removing a fuselage crown portion of the original semi-monocoque structure directly above the main cabin; (b) installing a substitute fuselage crown portion in place of the original fuselage crown portion, wherein the substitute fuselage crown portion comprises a cabin hanging floor structure and an upper semi-monocoque structure that define a crown cabin; and (c) installing a multiplicity of passenger seats in the crown cabin, wherein the hanging floor structure comprises a central portion, a first angled portion connected to the central portion and attached to or integrally formed with a remainder of the original semi-monocoque structure or to the upper semi-monocoque structure at an elevation which is higher than an upper surface of the central portion, and a second angled portion connected to the central portion and attached to or integrally formed with the remainder of the original semi-monocoque structure or to the upper semi-monocoque structure at an elevation which is higher than the upper surface of the central portion of the upper deck, the central portion being structurally supported by the first and second angled portions. In accordance with one embodiment, step (b) comprises: attaching the first and second angled portions to the upper semi-monocoque structure to form a pre-assembled crown cabin unit; and attaching the pre-assembled crown cabin unit to the remainder of the original semi-monocoque structure.

Other aspects of aircraft configurations having a crown cabin disposed above a main cabin are disclosed and claimed below.

BRIEF DESCRIPTION OF THE DRAWINGS

Various embodiments will be hereinafter described with reference to drawings for the purpose of illustrating the foregoing and other aspects of the disclosure.

FIGS. 7A and 7B are diagrams representing sectional views of forward and aft portions of an aircraft in accordance with a third embodiment having a main cabin, a crown cabin, and a baggage/cargo hold, the crown cabin being defined by an upper semi-monocoque structure of the fuselage and a hanging floor structure attached to or integrally formed with the fuselage and having two-abreast premium or first class seating in a forward portion and four-abreast economy or tourist class seating in an aft portion.

Reference will hereinafter be made to the drawings in which similar elements in different drawings bear the same reference numerals.

DETAILED DESCRIPTION

Typically, aircraft design commences with consideration of interior requirements such as number of aisles, number of seats and how these are grouped in rows and columns, service areas, storage areas (e.g., overhead bins), checked-in baggage compartments, and the like. Once the parameters defining these requirements have been met with an interior design, a fuselage may be designed to envelope the interior design. The fuselage is typically constructed with a fuselage skin structurally connected to a skeleton structure that includes a series of spaced-apart, hoop-shaped frames that define the aircraft cross section at locations along the length of the fuselage. Thus not all frames are identical; if the aircraft tapers from central section to tail section, for example, then frames near the center of the aircraft may be larger hoops and successive frames will decrease in hoop size and the hoop shape of the frame may also change, moving aft to the tail section. A frame may comprise a multiplicity of frame members connected end to end or may be fabricated as one piece. Frame spacing may vary, but is typically in the range 18 to 25 inches apart. These frames are covered with an aircraft skin, typically made up of skin panels, typically provided with adjacent stiffening stringers, to produce the outer shell of the fuselage that encloses the interior. Stringers or longerons may also be provided to act with the skin and frames. A cabin is formed inside the fuselage by supplying a floor, a ceiling and covering the interior sides of the fuselage with decorative interior panels.

Figure 1:
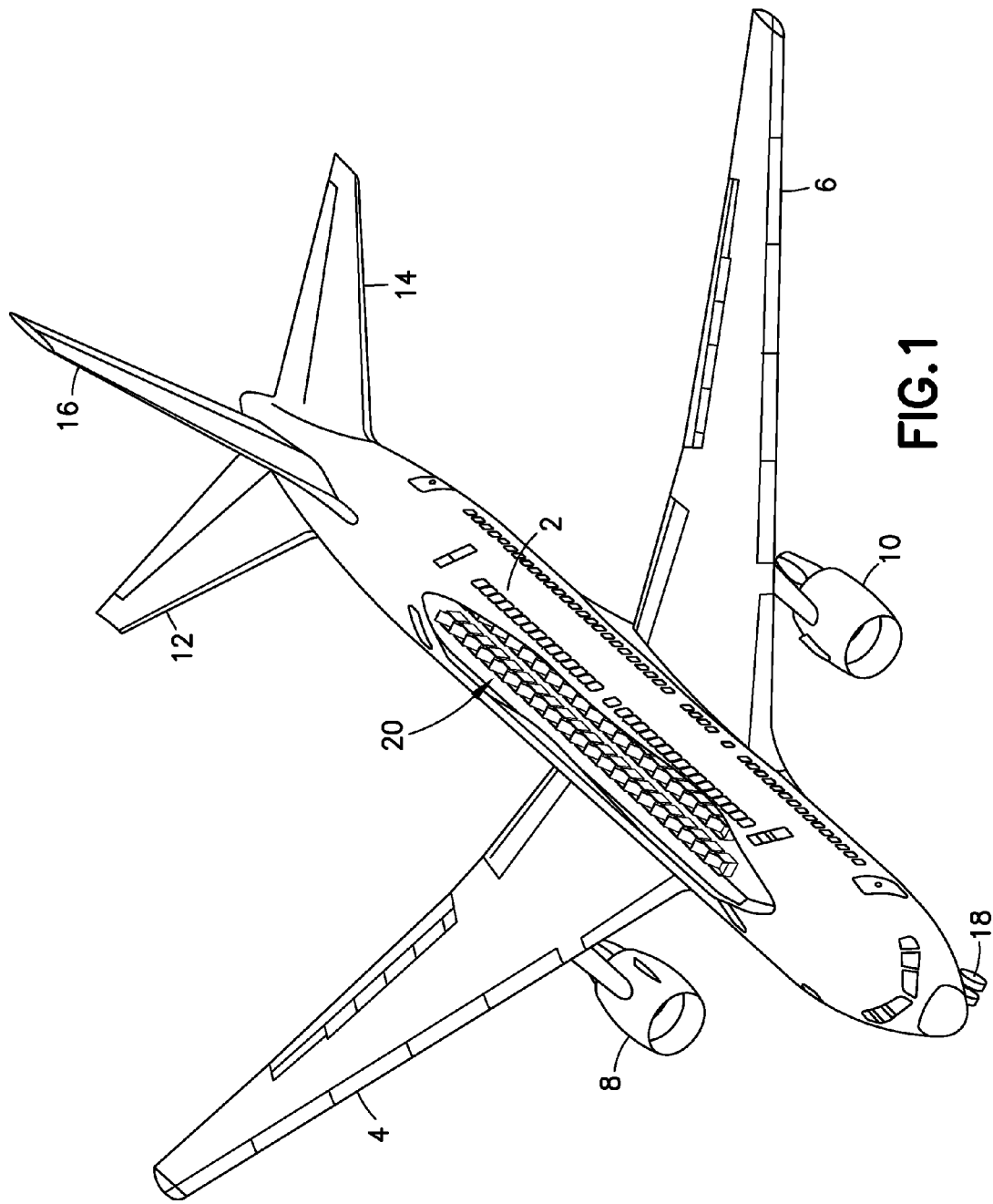
FIG. 1 is a diagram representing a cutaway isometric view of an aircraft in accordance with a first embodiment having a main cabin, a crown cabin above the main cabin, and a baggage/cargo hold below the main cabin.

FIG. 1 is a diagram showing a cutaway isometric view of an aircraft having a crown cabin configuration in accordance with a first embodiment. This aircraft comprises a tubular fuselage 2, a pair of wings (primary airfoils) 4 and 6, a pair of gas turbofan engines 8 and 10 respectively mounted to the wings 4 and 6, a pair of horizontal stabilizers 12 and 14, and a vertical fin or blade 16 that is integrated with an aft portion of the fuselage 2. The fuselage 2 has a semi-monocoque construction with a multiplicity of frames (not shown) covered by a skin in a manner known in the art. Each aircraft further comprises a nose landing gear 18 and a main landing gear comprising a pair of main landing gear units (not visible in FIG. 1, but see main landing gear units 44 and 46 in FIG. 4A). The aircraft depicted in FIG. 1 has a main cabin (not visible), a crown cabin 20 disposed above the main cabin (visible because a portion of the fuselage 2 has been removed) in an upper lobe of the fuselage 2, and a baggage/cargo hold (not visible) disposed below the main cabin in a lower lobe of the fuselage 2.

Figure 4A:
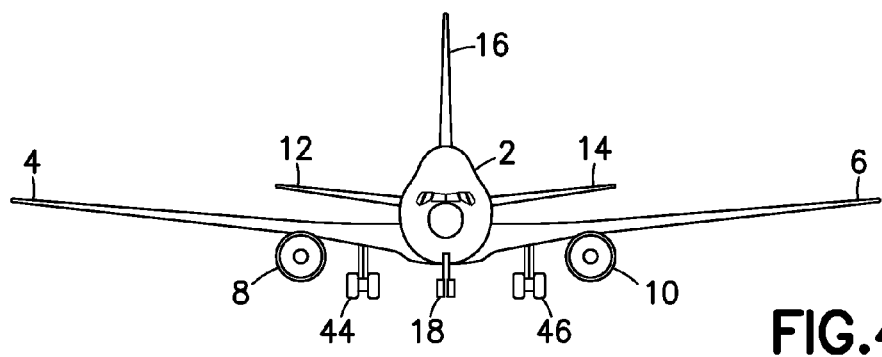
FIGS. 4A, 4B and 4C are diagrams respectively representing front, top and side views of the aircraft depicted in FIG. 1.
Figure 4B:
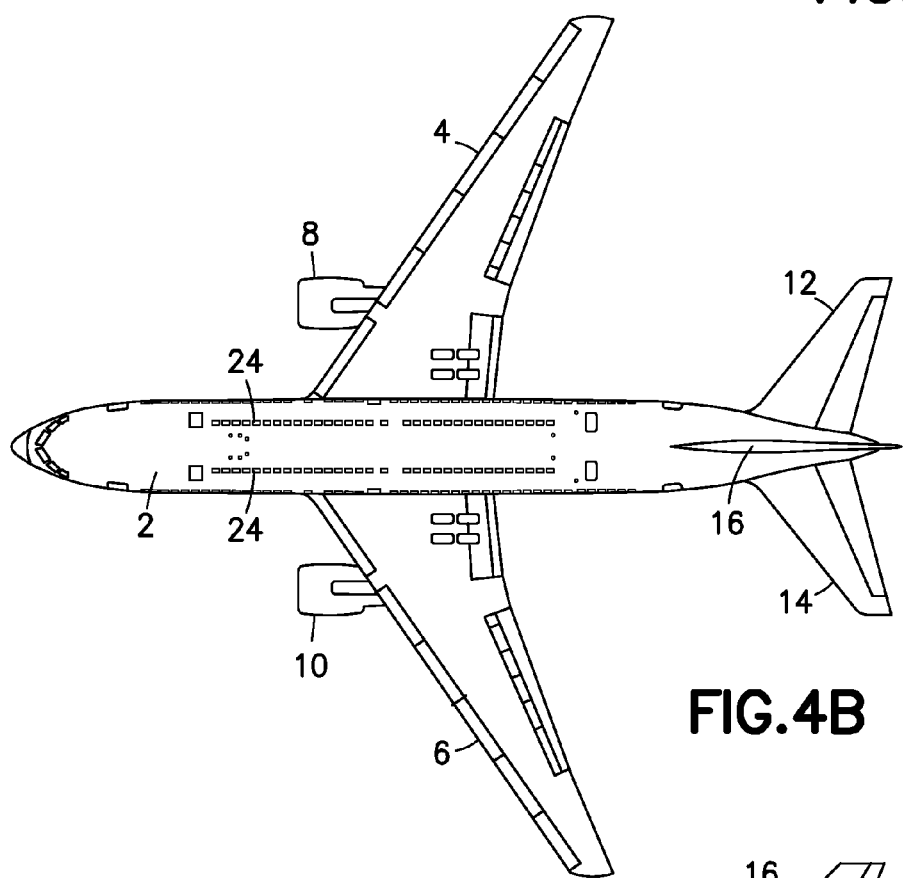
Figure 4C:
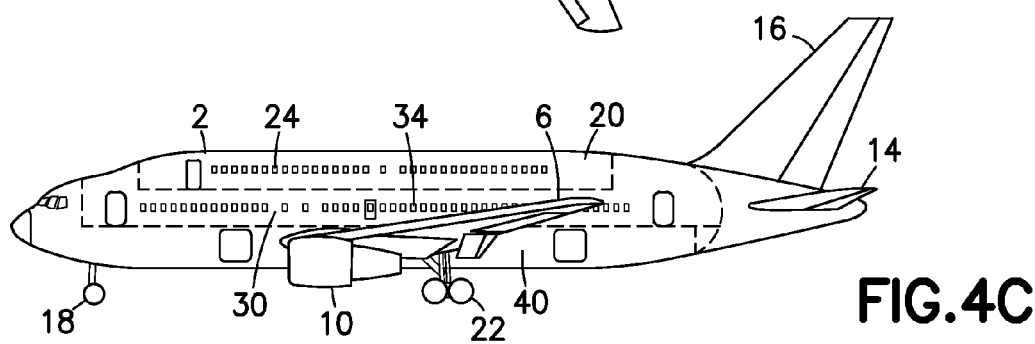

FIGS. 4A, 4B and 4C are diagrams respectively showing front, top and side views of the aircraft depicted in FIG. 1. FIG. 4C generally indicates a crown cabin 20, a main cabin 30 disposed below and extending beyond the crown cabin 20, and a storage space 40 for holding baggage and/or cargo disposed below the main cabin 30. The forward and aft limits of the crown cabin 20 are indicated by the uppermost two dashed vertical lines in FIG. 4C.

Figure 2:
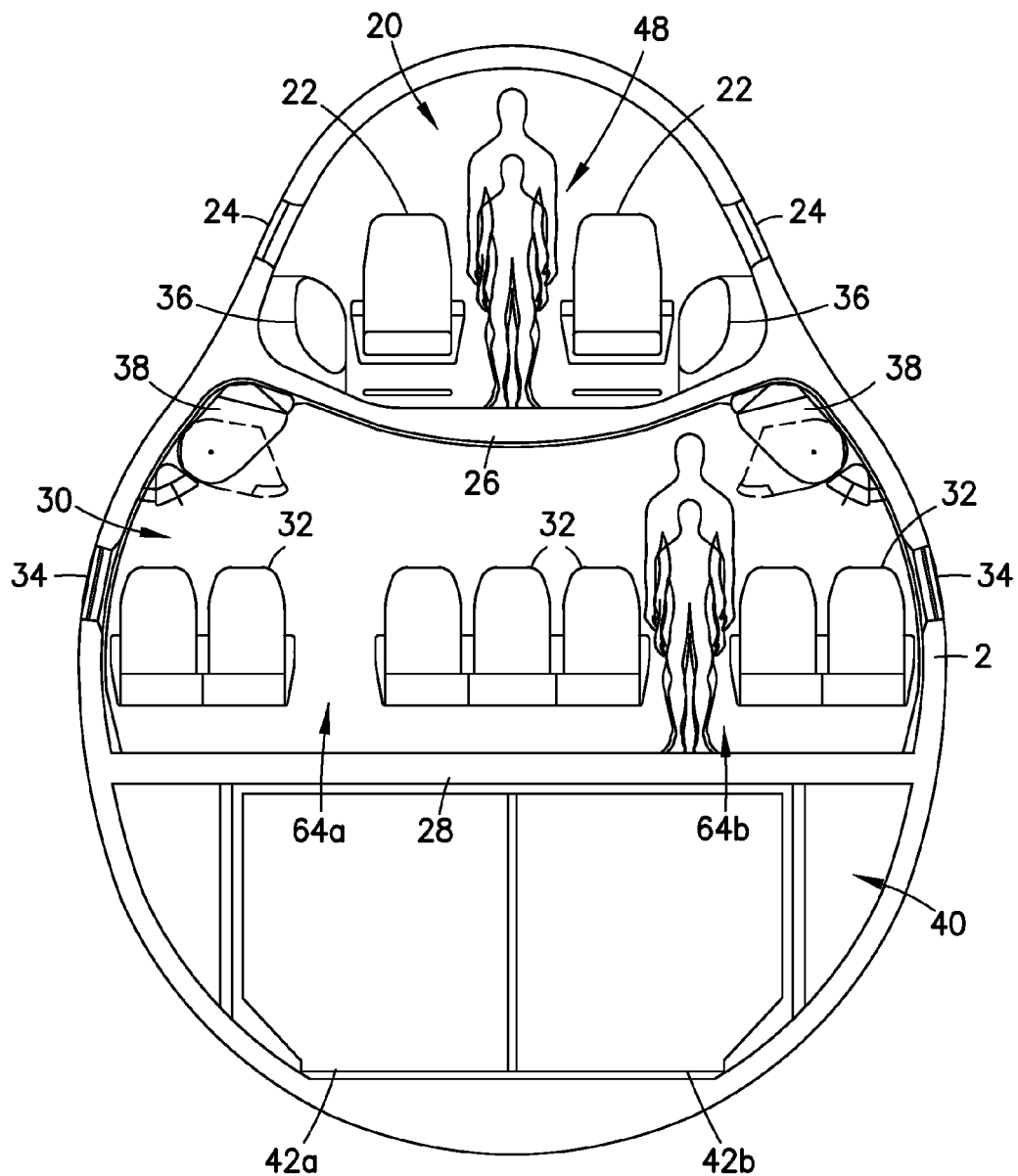
FIG. 2 is a diagram representing a sectional view of a portion of the aircraft depicted in FIG. 1 in which the crown cabin is defined by an upper semi-monocoque structure of the fuselage and a hanging floor structure attached to or integrally formed with the fuselage, which hanging floor structure supports two-abreast premium or first class seating.

FIG. 2 is a diagram showing a sectional view of a portion of the aircraft depicted in FIG. 1 (the sectional plane passes through the fuselage at a mid-point of crown cabin and is perpendicular to a longitudinal axis of the fuselage). As seen in FIG. 2, the crown cabin 20 is defined by an upper semi-monocoque structure 2a that forms an upper lobe of fuselage 2 and a upper deck 26 having a hanging floor structure attached to or integrally formed with the fuselage. The main cabin 30 is defined by portions of a lower semi-monocoque structure 2b of fuselage 2, the upper deck 26 (which separates the crown cabin 20 from the main cabin 30), and a lower deck 28 which separates the main cabin 30 from the storage space 40. The storage space 40 is defined by a lower-lobe portion of the lower semi-monocoque structure 2b of fuselage 2 and the lower deck 28. For the purpose of illustration, FIG. 2 depicts a pair of unit load devices 42a and 42b which have been loaded into the storage space 40.

As will be explained in more detail below with reference to FIGS. 15-17, the upper and lower semi-monocoque structures 2a and 2b may be attached to each other to form a fuselage 2 or may be integrally connected to each other to form a single integral semi-monocoque structure that is the fuselage 2. In cases where the upper and lower semi-monocoque structures 2a and 2b are attached to each other, the opposing sides of the upper deck 26 may be attached to or integrally formed with at least one of the upper and lower semi-monocoque structures 2a and 2b. In cases where the upper and lower semi-monocoque structures 2a and 2b form a single integral semi-monocoque structure, i.e., the fuselage 2, the upper deck 26 is attached to that single integral semi-monocoque structure.

In accordance with the embodiment depicted in FIG. 2, the crown cabin 20 is provided with a multiplicity of passenger seats 22 arranged in a two-abreast premium or first class seating configuration on the upper deck 26, whereas the main cabin 30 is provided with a multiplicity of passenger seats 32 arranged in a seven-abreast economy or tourist class seating configuration on the lower deck 28. Passenger seats 22 in the crown cabin 20 face forward and are separated by a longitudinal aisle 48. In other embodiments, passenger seats 22 may be angled seats, herringbone seats, aft-facing seats or side-facing seats. The passengers seated in crown-cabin passenger seats 22 can look out windows 24 installed in openings formed in the upper semi-monocoque structure 2a of fuselage 2. Passenger seats 32 in the main cabin 30 face forward and are separated into two pairs and one central trio of seats by two longitudinal aisles 64a and 64b. The passengers seated in main cabin passenger seats 32 can look out windows 34 installed in openings formed in the lower semi-monocoque structure 2b of fuselage 2. For storing carry-on luggage, the crown cabin 20 is equipped with floor-mounted sidewall bins 36 on both sides, while the main cabin 30 is equipped with overhead bins 38 on both sides.

Figure 3:
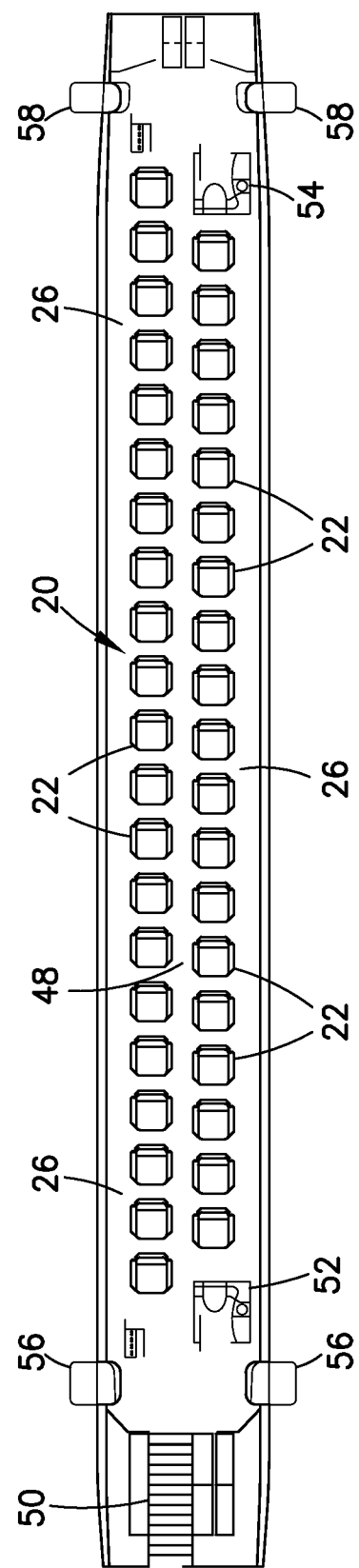
FIG. 3 is a diagram representing a plan view of a crown cabin interior arrangement having two-abreast premium or first class seating in accordance with the embodiment depicted in FIGS. 1 and 2.

FIG. 3 shows a plan view of a crown cabin interior arrangement having two-abreast premium or first class seating in accordance with the embodiment depicted in FIGS. 1 and 2. The passenger seats 22 are arranged in two columns separated by a longitudinal aisle 48. The passenger seats 22 on one side of the longitudinal aisle 48 may be horizontally staggered (in a longitudinal direction) relative to the passenger seats 22 on the other side of the longitudinal aisle 48. The crown cabin 20 is provided with a forward lavatory 52 and an aft lavatory 54. The upper deck 26 is connected to the lower deck (not shown in FIG. 3) by a stairway 50 at the forward end of the crown cabin 20. The passengers in the crown cabin 20 may enter and exit the aircraft via forward exits 56 and aft exits 58 disposed on both sides of the fuselage 2. In the implementation shown in FIG. 3, the crown cabin seat count is 40. However, it should be appreciated that the crown cabin seat count may vary without departing from the scope of the claims appended hereto.

Figure 5:
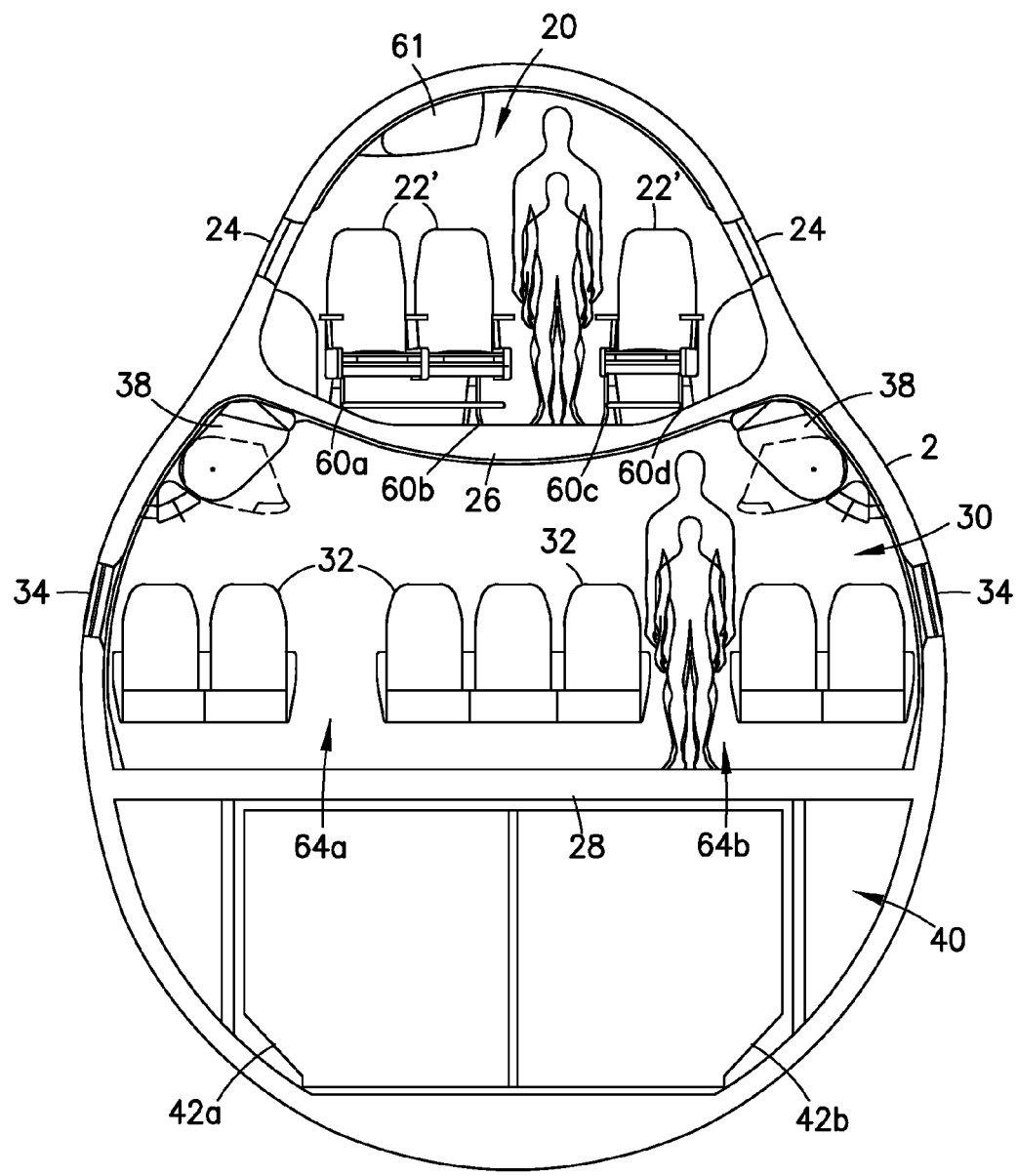
FIG. 5 is a diagram representing a sectional view of a portion of an aircraft in accordance with a second embodiment having a main cabin, a crown cabin, and a baggage/cargo hold, the crown cabin being defined by an upper semi-monocoque structure of the fuselage and a hanging floor structure attached to or integrally formed with the fuselage and having three-abreast economy or tourist class seating.

FIG. 5 shows a sectional view of a portion of an aircraft in accordance with a second embodiment which may have a structure nearly identical to the structure previously described with reference to FIG. 2, but with the following differences. A first difference is that the passenger seats 22' in crown cabin 20 are arranged in a three-abreast economy or tourist class seating configuration instead of a two-abreast premium or first class seating configuration. As seen in FIG. 5, at least one row of passenger seats 22' has a pair of adjacent seats on one side of the aisle and a third seat 22' on the other side of the aisle. The passenger seats 22' are mounted on seat tracks 60a-60d fastened to the upper deck 26. A second difference is that the crown cabin 20 contains overhead bins 61 on the side of the aisle where pairs of adjacent seats 22' are disposed. The seating configuration in main cabin 30 may be identical to the seating configuration previously described with reference to FIG. 2.

Figure 6:
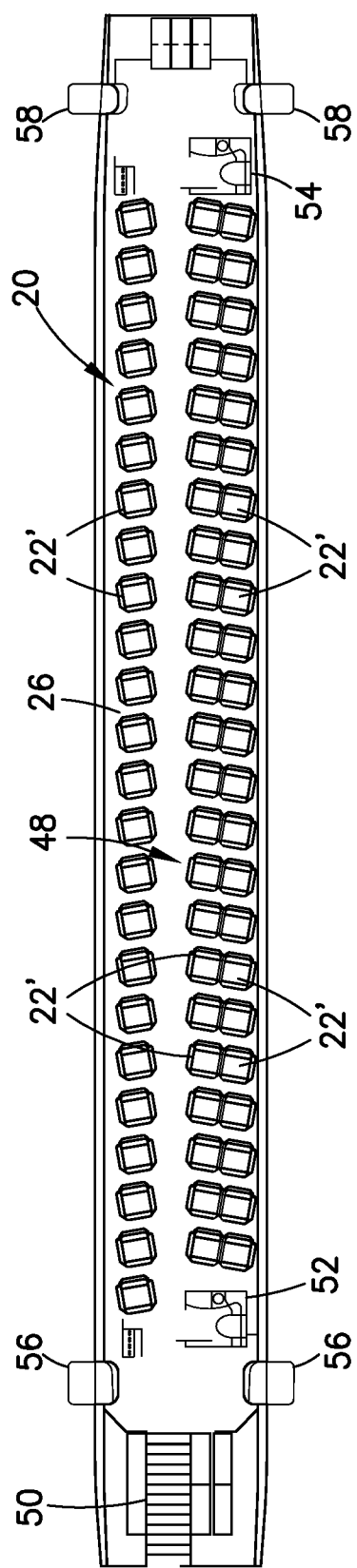
FIG. 6 is a diagram representing a plan view of a crown cabin interior arrangement with three-abreast economy or tourist class seating in accordance with the embodiment depicted in FIG. 5.

FIG. 6 shows a plan view of a crown cabin interior arrangement with three-abreast economy or tourist class seating in accordance with the embodiment depicted in FIG. 5. The passenger seats 22' are arranged in three columns, the first column being separated from the second and third columns by a longitudinal aisle 48. The passenger seats 22' in the second and third columns are arranged side by side. The passenger seats 22' may be angled toward the longitudinal aisle 48 as shown (e.g., by about 10°). Again the crown cabin 20 is provided with a forward lavatory 52 and an aft lavatory 54. The upper deck 26 is connected to the lower deck (not shown in FIG. 6) by a stairway 50 at the forward end of the crown cabin 20. The passengers in the crown cabin 20 may enter and exit the aircraft via forward exits 56 and aft exits 58 disposed on both sides of the fuselage 2. In the implementation shown in FIG. 6, the crown cabin seat count is 73. However, it should be appreciated that the crown cabin seat count may vary without departing from the scope of the claims appended hereto.

The crown cabin may contain other passenger seating configurations. FIGS. 7A and 7B show sectional views of an aircraft in accordance with a third embodiment in which one portion of the crown cabin 20 has passenger seats 22 arranged in a two-abreast premium or first class seating configuration and another portion of the crown cabin 20 has passenger seats 22' arranged in a four-abreast economy or tourist class seating configuration. The main cabin 30 may again be provided with a multiplicity of passenger seats 32 arranged in a seven-abreast economy or tourist class seating configuration, as previously described with reference to FIG. 2. The main cabin is also provided with oversized overhead luggage bins 65 on both sides.

Figure 8:
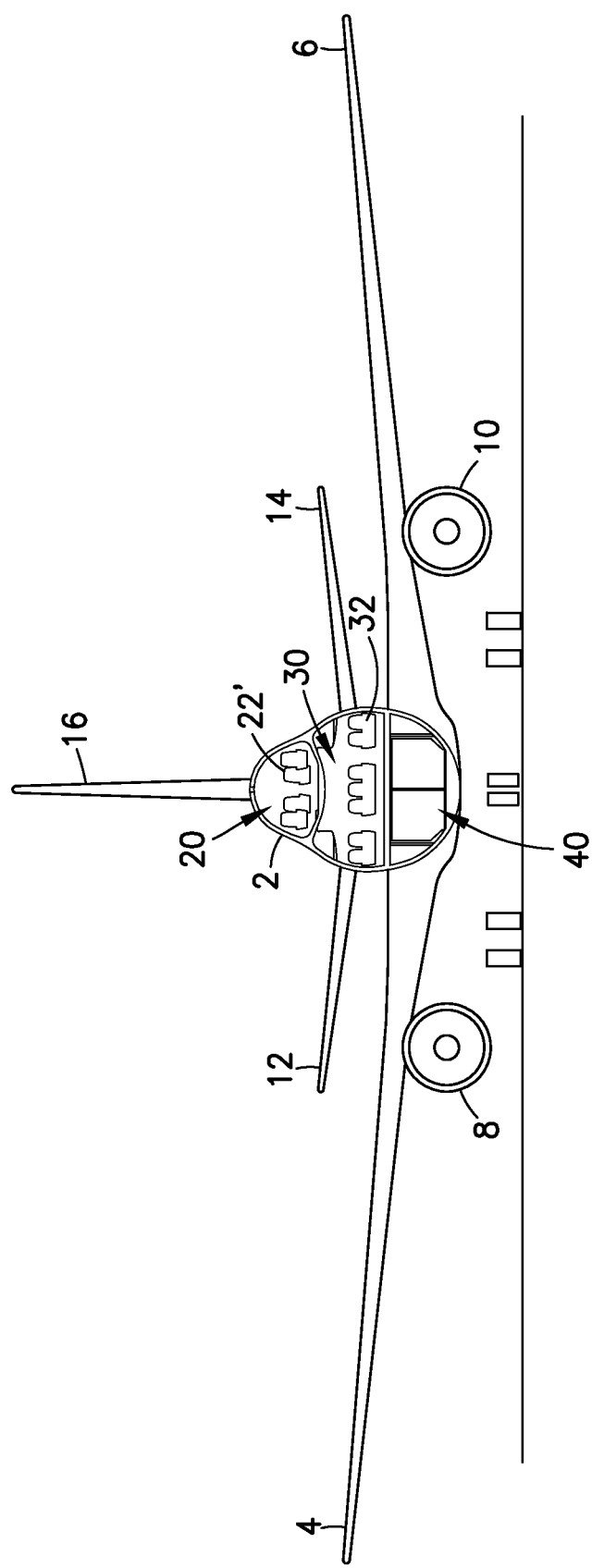
FIG. 8 is a diagram representing a partial front and partial sectional view of an aircraft that has passenger seating of the type depicted in FIG. 7A in a forward portion of the crown cabin (not shown in FIG. 8) and passenger seating of the type depicted in FIG. 7B in an aft portion of the crown cabin.

FIG. 8 shows a partial front and partial sectional view of an aircraft that has passenger seats arranged as depicted in FIG. 7A in a forward portion of the crown cabin 20 (not shown in FIG. 8) and passenger seats 22' of the type depicted in FIG. 7B in an aft portion of the crown cabin 20. (Only the wheels of the nose and main landing gear units are shown in FIG. 8.)

Figure 9:
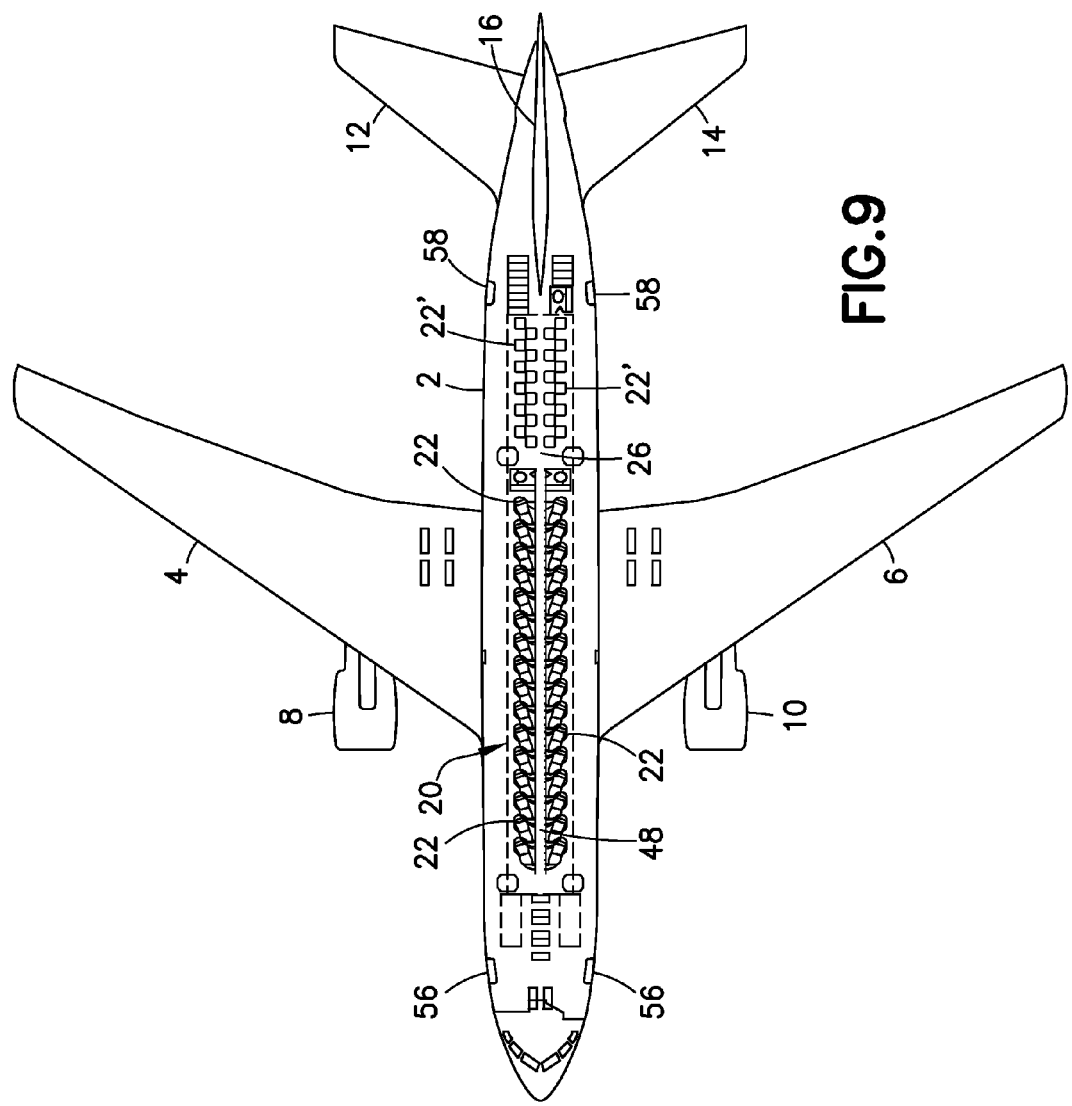
FIG. 9 is a diagram representing a partial top and partial crown cabin interior plan view of the aircraft depicted in FIGS. 7 and 8, which aircraft has premium or first class inward-facing angled seats in a forward section of the crown cabin and economy or tourist class staggered forward- and aft-facing paired seats in an aft section of the crown cabin.

FIG. 9 shows a partial top and partial crown cabin interior plan view of the aircraft depicted in FIGS. 7 and 8. The longitudinal aisle 48 runs the length of the crown cabin 20. This aircraft has premium or first class inward-facing angled passenger seats 22 (e.g., sleeper seats) in a forward section of the crown cabin 20. Outward facing angled seats or forward- or aft-facing seats could be used in alternate embodiments. The aircraft depicted in FIG. 9 also has economy or tourist class staggered forward- and aft-facing paired passenger seats 22' in an aft section of the crown cabin 20, meaning that adjacent passengers are sitting one facing substantially forward and one facing substantially aft. The passenger seats 22' on either side of longitudinal aisle 48 may include horizontal and vertical stagger to optimize seat count and seat comfort within the restricted space available in the crown cabin illustrated. As used herein, the term "horizontal stagger" means that a first passenger sitting next to a second passenger has his/her seat pan slightly forward or aft of the second passenger's seat pan, thereby reducing hip and shoulder interference for larger people. As used herein, the term "vertical stagger" means that a first passenger sitting next to a second passenger has his/her seat pan slightly higher or lower than the elevation of the second passenger's seat pan, which also reduces hip and shoulder interference. (As used herein, an "elevation" can be measured relative to a vertical axis which intersects and is perpendicular to a longitudinal centerline bisecting the upper deck 26.) In the forward section of the crown cabin 20, the longitudinal aisle 48 separates the two passenger seats 22 in each row and has a first width; in the aft section of the crown cabin 20, the longitudinal aisle 48 separates the two pairs of passenger seats 22' in each row and has a second width less than the first width.

In accordance with a variation of the third embodiment depicted in FIG. 9, the aft section of the crown cabin 20 may be provided with staggered forward-facing paired seats, including horizontal and vertical stagger to optimize seat count and seat comfort within the restricted space available in the crown cabin. Alternate embodiments could use just one of horizontal and vertical stagger.

Figure 10:
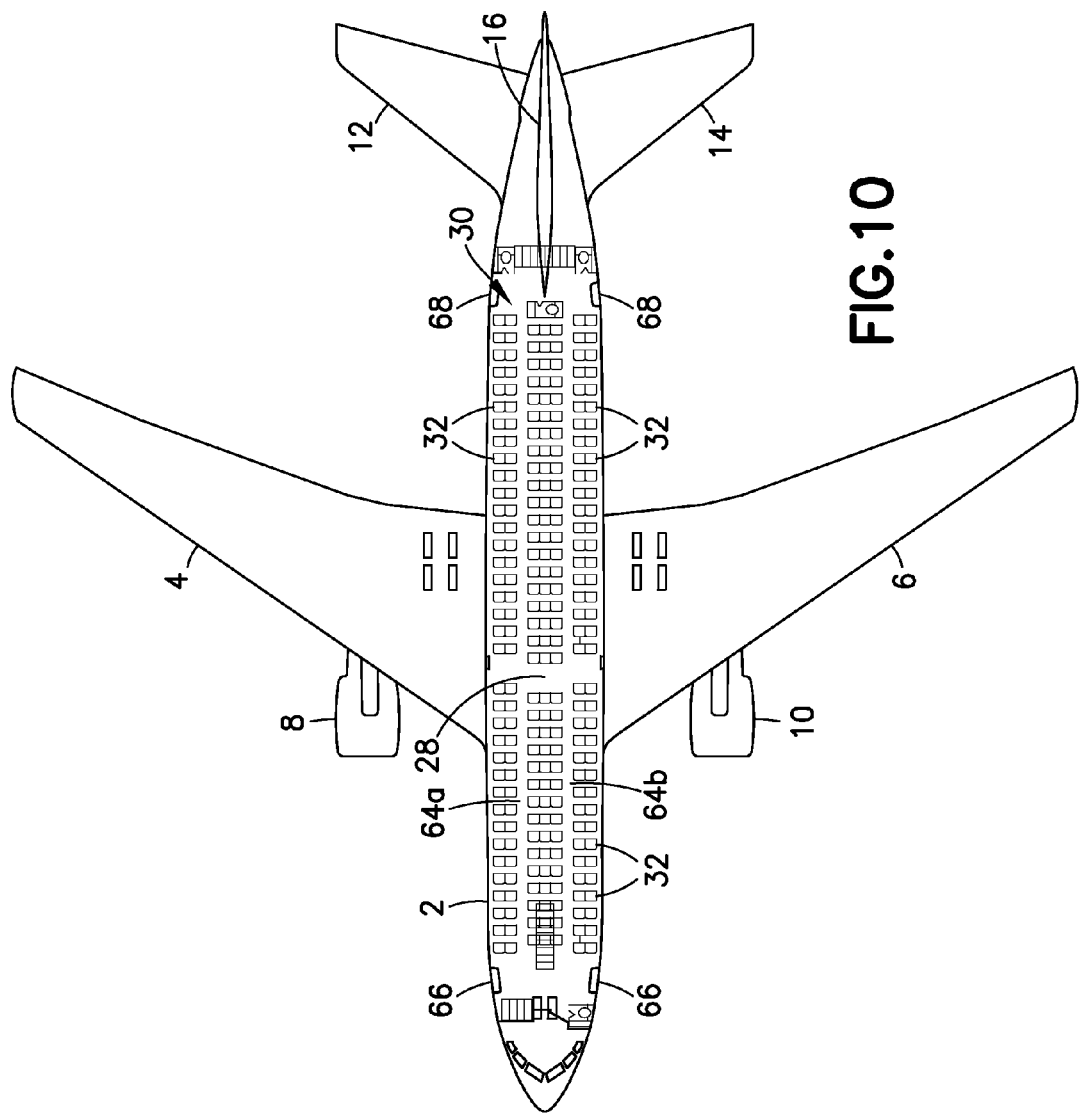
FIG. 10 is a diagram representing a partial top and partial main cabin interior plan view of an aircraft in accordance with any one of the first through third embodiments.

FIG. 10 shows a partial top and partial main cabin interior plan view of an aircraft in accordance with any one of the first through third embodiments. The passengers in the main cabin 30 may enter and exit the aircraft via forward exits 66 and aft exits 68 disposed on both sides of the fuselage 2. Passenger seats 32 in the main cabin 30 face forward and are separated into two pairs and one central trio of seats by two longitudinal aisles 64a and 64b. In the implementation depicted in FIG. 10, the main cabin seat count is 241. However, it should be appreciated that the main cabin seat count may vary without departing from the scope of the claims appended hereto.

Figure 11:
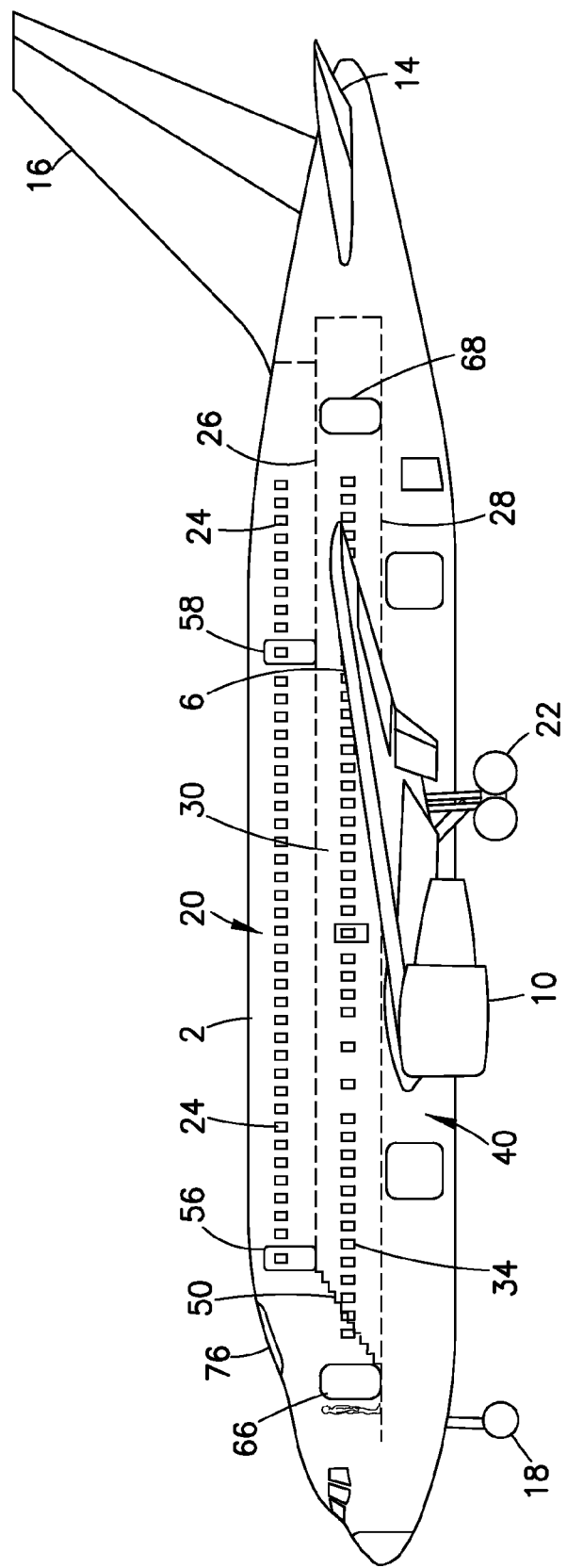
FIG. 11 is a diagram representing a side view of an aircraft that incorporates the crown cabin of FIG. 9 and the main cabin of FIG. 10.

FIG. 11 shows a side view of an aircraft that incorporates the crown cabin of FIG. 9 and the main cabin of FIG. 10. The upper horizontal dashed line represents the position of the upper deck 26, while the lower horizontal dashed line represents the position of the lower deck 28. A skylight 76 is installed in the fuselage 2 at the forward end of the crown cabin 20 and/or at least in part above a stairway 50 that connects the lower deck 28 and the upper deck 26.

Figure 12:
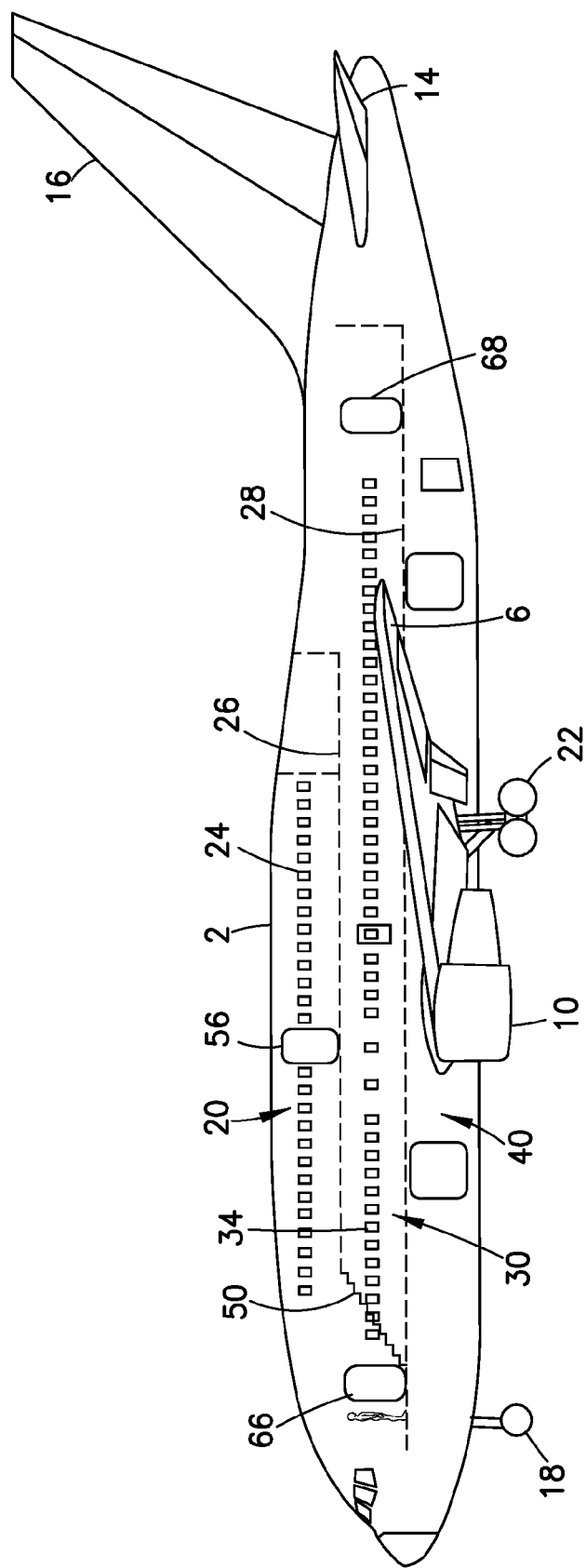
FIG. 12 shows a side view of an aircraft in accordance with a fourth embodiment having a crown cabin disposed in a forward section of the fuselage which is only about half as long as the main cabin.

FIG. 12 shows a side view of an aircraft in accordance with a fourth embodiment having a crown cabin 20 disposed in a forward section of the fuselage which is only about half as long as the main cabin 30. As seen in FIG. 12, the crown cabin 20 does not extend aft of the wings 4 and 6. The upper horizontal dashed line represents the position of the upper deck 26, while the lower horizontal dashed line represents the position of the lower deck 28. A skylight 76 is installed in the fuselage 2 at the forward end of the crown cabin 20.

Figure 13:
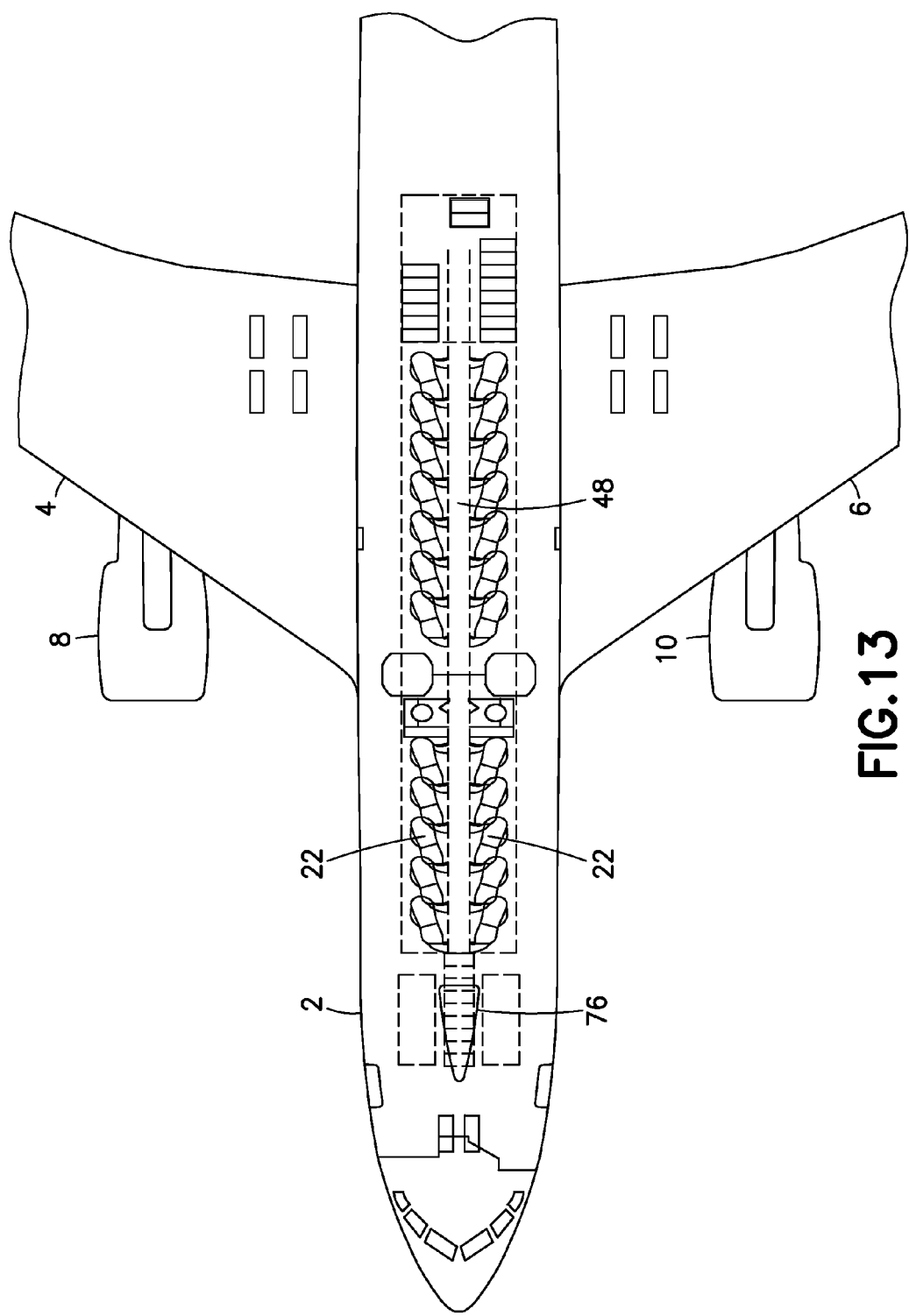
FIG. 13 shows a partial top and partial crown cabin interior plan view of the aircraft depicted in FIG. 12, which aircraft has only premium or first class inward-facing angled seats in the crown cabin.

FIG. 13 shows a partial top and partial crown cabin interior plan view of the aircraft depicted in FIG. 12. This aircraft has only premium or first class inward-facing angled passenger seats 22 (e.g., sleeper seats) in the crown cabin 20. The longitudinal aisle 48 separates the two passenger seats 22 in each row. In the implementation depicted in FIG. 13, the crown cabin seat count is 24. However, it should be appreciated that the crown cabin seat count may vary without departing from the scope of the claims appended hereto.

Figure 14:
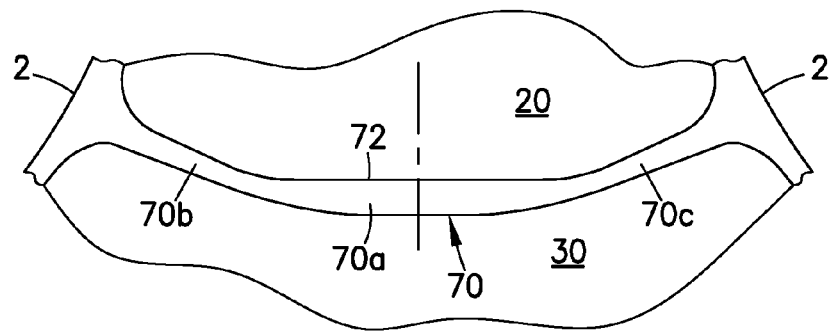
FIG. 14 is a diagram showing an exemplary transverse floor beam attached to or integrally formed with opposing sides of a fuselage having a semi-monocoque structure, which transverse floor beam is suitable for incorporation in any one of the crown-cabin hanging floor structures shown in FIGS. 2, 5, 7A and 7B.

FIG. 14 shows a transverse floor beam 70 suitable for use in a crown-cabin hanging floor structure that serves as the upper deck 26 depicted in any of FIGS. 2, 5, 7A and 7B. The ends of the transverse floor beam 70 are attached to opposite sides of the fuselage 2, which has a semi-monocoque structure. The hanging floor structure may comprise a multiplicity of transverse floor beams 70 that span the interior of the fuselage as well as upper and lower panels (not shown in FIG. 14) which extend along the length of the crown cabin 20. The transverse floor beams 70 and upper and lower panels (not shown in FIG. 14) together form the upper deck 26 (see FIGS. 2, 5, 7A, 7B).

Still referring to FIG. 14, each transverse floor beam 70 comprises a central portion 70a having a generally horizontal upper surface 72, a first angled portion 70b connected to the central portion 70a and attached to one side of the fuselage 2 at an elevation which is higher than the elevation of the upper surface 72 of the central portion 70a, and a second angled portion 70c connected to the central portion 70a and attached to the other side of the fuselage 2 at an elevation which is higher than the elevation of the upper surface 72 of the central portion 70a. The central portion 70a is structurally supported by the first and second angled portions 70b and 70c.

Figure 15:
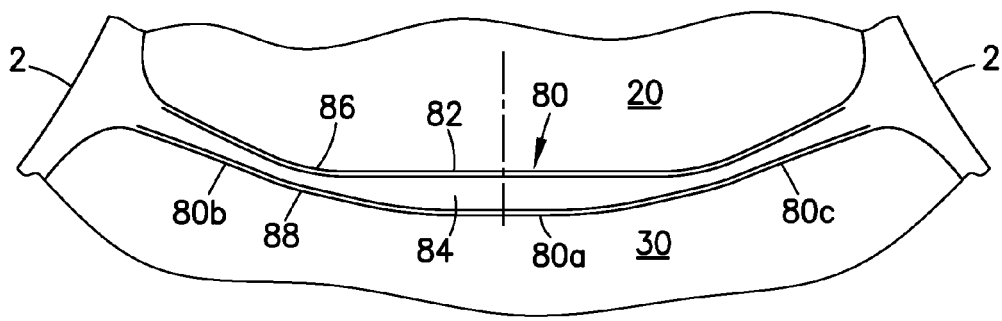
FIG. 15 is a diagram showing an exemplary transverse floor beam attached to or integrally formed with opposing sides of a fuselage having a semi-monocoque structure, which transverse floor beam is designed to carry critical loads while adding minimal weight to the aircraft.

FIG. 15 shows another transverse floor beam 80 suitable for use in the embodiments described above. Again the ends of the transverse floor beam 80 are attached to opposite sides of the fuselage 2, which has a semi-monocoque structure. The crown-cabin hanging floor structure may comprise a multiplicity of transverse floor beams 80 that span the interior of the fuselage from one side to the other side, as well as upper and lower panels (not shown in FIG. 15) which span the spaces between the transverse floor beams 80. Each transverse floor beam 80 may comprise an upper flange 86 and a lower flange 88 connected by a web 84. The upper flanges 86 and lower flanges 88 of the transverse floor beams 80 can be constructed using strong materials and/or ply tailored composite materials to carry critical loads for selected critical load conditions while minimizing the weight of the hanging floor structure.

Still referring to FIG. 15, each transverse floor beam 80 comprises a central portion 80a, a first angled portion 80b connected to the central portion 80a and attached to one side of the fuselage 2 at an elevation which is higher than the elevation of an upper surface 82 of the upper flange 86 of the central portion 80a, and a second angled portion 80c connected to the central portion 80a and attached to the other side of the fuselage 2 at an elevation which is higher than the elevation of the upper surface 82 of the upper flange 86 of the central portion 80a. The central portion 80a is structurally supported by the first and second angled portions 80b and 80c.

Figure 16:
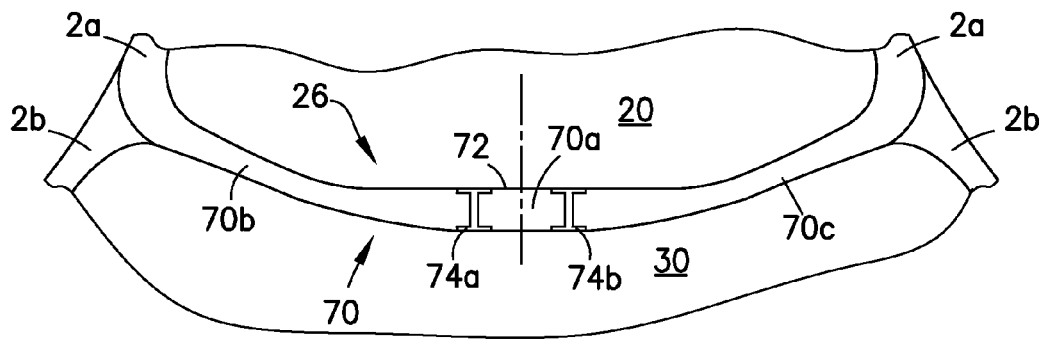
FIG. 16 is a diagram showing an exemplary crown-cabin hanging floor structure comprising a matrix of longitudinal and transverse floor beams. Each transverse floor beam is integrated with a crown-cabin perimeter frame, the resulting integrated structure being attached to opposing sides of a main-cabin perimeter frame.

FIG. 16 shows an upper deck 26 having an exemplary crown-cabin hanging floor structure comprising a matrix of longitudinal and transverse floor beams. In the view depicted in FIG. 16, one transverse floor beam 70 and two longitudinal floor beams 74a and 74b are visible. Although the longitudinal floor beams 74a and 74b are depicted in FIG. 16 as being I-beams, optionally beams having other cross-sectional profiles may be used, such as rectangular, C-shaped, and Z-shaped. The longitudinal and transverse floor beams may be integrated with a crown-cabin perimeter frame that is part of an upper semi-monocoque structure 2a. The resulting integrated structure (i.e., the upper deck 26 plus the upper semi-monocoque structure 2a) is attached to opposing sides of a main-cabin perimeter frame that is part of a lower semi-monocoque structure 2b. The integrated structure may be joined to the lower semi-monocoque structure 2b by means of bolted joints, bonded joints, fastened joints, etc. The upper and lower semi-monocoque structures 2a and 2b (only partially shown in FIG. 16) are configured to form a fuselage.

Still referring to FIG. 16, each transverse floor beam 70 comprises a central portion 70a and first and second angled portions 70b and 70c connected to the central portion 70a. The first and second angled portions 70b and 70c are respectively integrally formed with opposing sides of a crown-cabin perimeter frame that is part of the upper semi-monocoque structure 2a, the outer ends of first and second angled portions 70b and 70c being at an elevation which is higher than the elevation of an upper surface 72 of the central portion 70a.

In accordance with one implementation, each transverse floor beam 70 passes through respective openings in the longitudinal floor beams 74a and 74b, in which case the central portion 70a is structurally supported by the first and second angled portions 70b and 70c and by the longitudinal floor beams 74a and 74b. In accordance with an alternative implementation, opposing ends of the central portion 70a are mated and attached to the longitudinal floor beams 74a and 74b respectively; one end of the first angled portion 70b is mated and attached to longitudinal floor beam 74a; and one end of the second angled portion 70c is mated and attached to longitudinal floor beam 74b.

Figure 17:
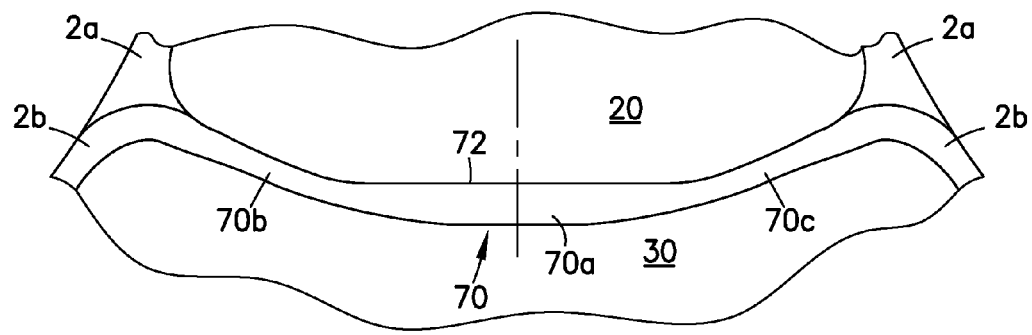
FIG. 17 is a diagram showing an exemplary transverse floor beam which is integrated with a main-cabin perimeter frame, the resulting integrated structure being attached to opposing sides of a crown-cabin perimeter frame.

FIG. 17 shows an exemplary transverse floor beam 70 which is integrated with a main-cabin perimeter frame that is part of a lower semi-monocoque structure 2b. Multiple transverse floor beams 70 can be spaced along the longitudinal axis of the fuselage and connected by ribs or stiffeners to form a hanging floor structure. The resulting integrated structure (i.e., the hanging floor structure having such transverse floor beams 70 plus the lower semi-monocoque structure 2b) is attached to opposing sides of a crown-cabin perimeter frame that is part of an upper semi-monocoque structure 2a. The integrated structure may be joined to the upper semi-monocoque structure 2a by means of bolted joints, bonded joints, fastened joints, etc. The upper and lower semi-monocoque structures 2a and 2b (only partially shown in FIG. 17) are configured to form a fuselage.

Figure 18:
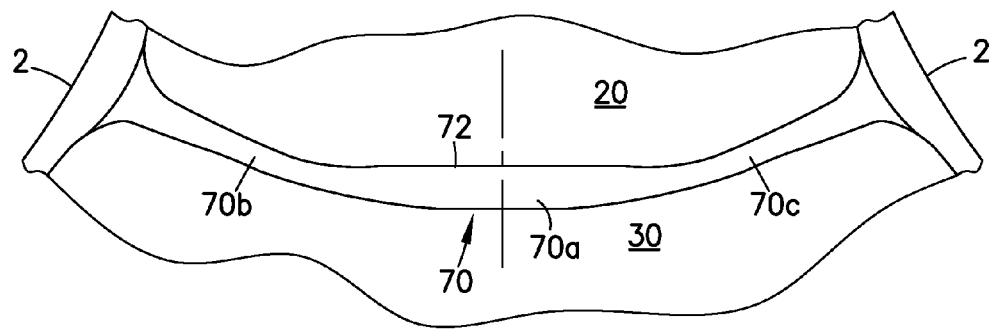
FIG. 18 is a diagram showing an exemplary transverse floor beam which is attached to a fuselage perimeter frame, which fuselage perimeter frame comprises a crown-cabin perimeter frame which is integrated with a main-cabin perimeter frame.

FIG. 18 shows an exemplary transverse floor beam 70 which is attached to opposing sides of a fuselage perimeter frame of a fuselage 2 having a semi-monocoque structure, which fuselage perimeter frame comprises a crown-cabin perimeter frame integrated with a main-cabin perimeter frame. Multiple transverse floor beams 70 can be spaced along the longitudinal axis of the fuselage 2 and connected by ribs or stiffeners to form a hanging floor structure. The opposing ends of each transverse floor beam 70 may be joined to the fuselage 2 by means of bolted joints, bonded joints, fastened joints, etc.

Figure 19:
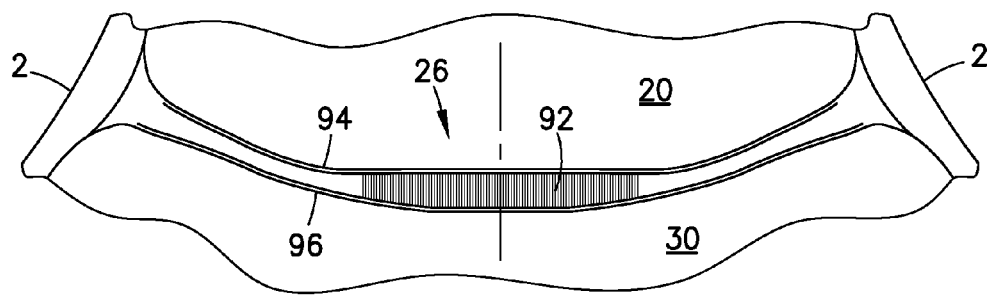
FIG. 19 is a diagram showing a crown-cabin hanging floor structure comprising a core sandwiched between upper and lower facesheets or panels in accordance with some embodiments.

FIG. 19 shows an upper deck 26 comprising a core 92 sandwiched between an upper facesheet or panel 94 and a lower facesheet or panel 96 in accordance with other embodiments. The outer ends of the angled side portions of the upper deck 26 depicted in FIG. 19 are attached to or integrally formed with opposite sides of the fuselage 2 at an elevation which is higher than the elevation of an upper surface of the upper facesheet 94 in a central portion of the upper deck 26, thereby forming a hanging floor structure. The upper and lower facesheets 94 and 96 of the upper deck 26 can be constructed using strong materials and/or ply tailored composite materials to carry critical loads for selected critical load conditions while minimizing the weight of the upper deck 26. The core 92 may comprise one or more of the following core types: honeycomb sandwich core, foam sandwich core, orthogrid core and isogrid core.

Figure 20:
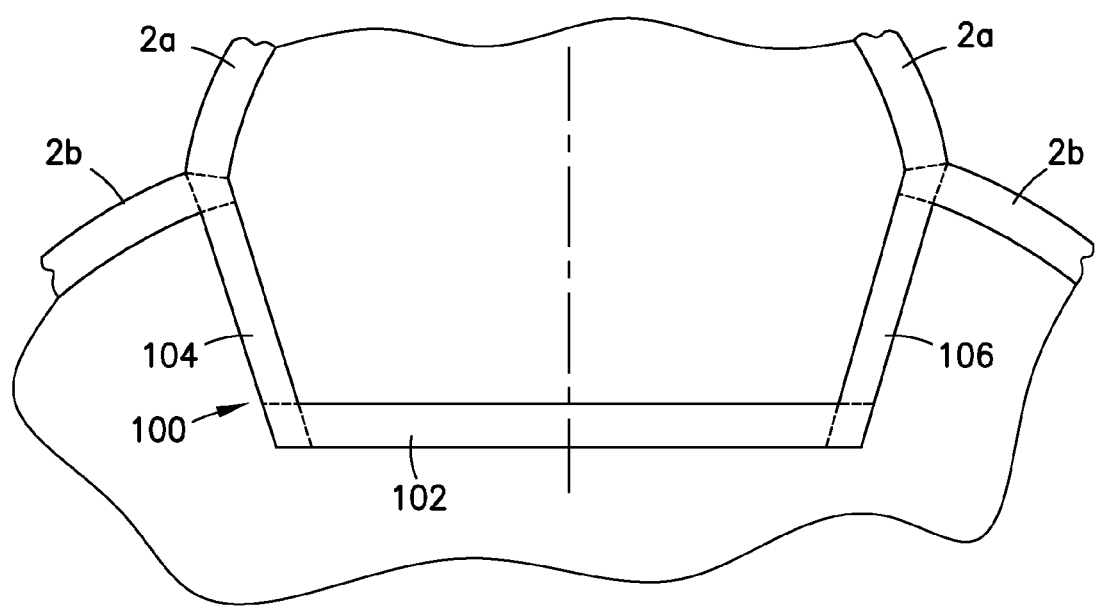
FIG. 20 is a diagram showing a crown-cabin hanging floor structure comprising a horizontal floor connected to a semi-monocoque structure by first and second angled sidewalls in accordance with an alternative embodiment.

FIG. 20 shows a crown-cabin hanging floor structure 100 comprising a horizontal floor 102 connected to a fuselage having a semi-monocoque structure by first and second angled sidewalls 104 and 106 in accordance with an alternative embodiment. In the implementation depicted in FIG. 20, the fuselage comprises an upper semi-monocoque structure 2a and a lower semi-monocoque structure 2b which are attached to each other. The upper ends of the first and second angled sidewalls 104 and 106 can be attached to or integrally formed with either the upper side regions of lower semi-monocoque structure 2b or the lower side regions of the upper semi-monocoque structure 2a. The lower ends of the first and second angled sidewalls 104 and 106 can be attached to or integrally formed with opposing ends of the horizontal floor 102.

Figure 21:
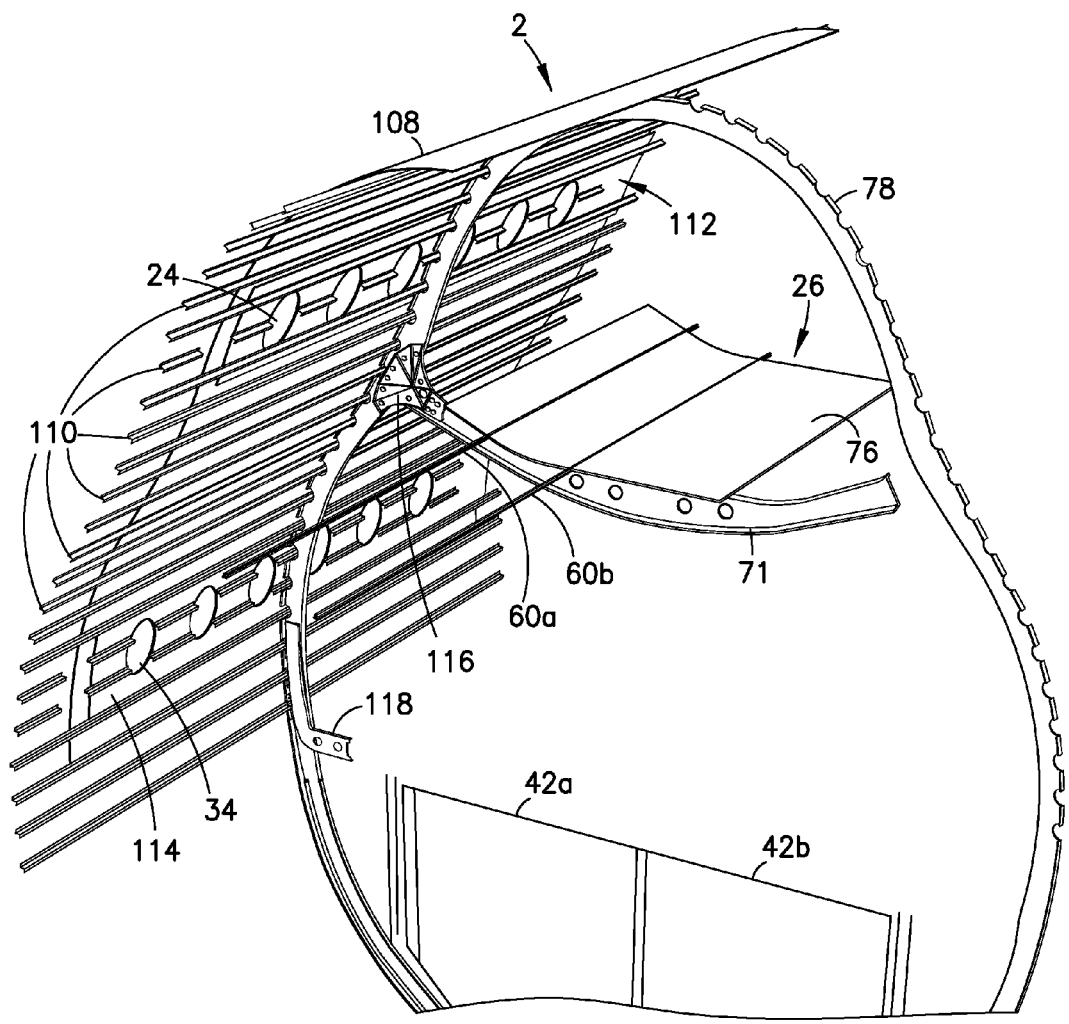
FIG. 21 is a diagram representing an isometric view of some components of an aircraft in accordance with one implementation in which an upper deck separating the main and crown cabins comprises transverse bow floor beams and honeycomb floor panels, the transverse bow floor beams being attached to the frames of the fuselage by means of floor beam fittings.

FIG. 21 is an isometric view showing some components of an aircraft in accordance with one implementation in which an upper deck 26 (separating a main cabin and a crown cabin not shown) comprises transverse bow floor beams 71 (only one of which is depicted in FIG. 21) and honeycomb floor panels 76 placed on top of the transverse bow floor beams 71. In this example, the fuselage 2 has a semi-monocoque structure comprising a multiplicity of frames 78 (only one of which is depicted in FIG. 21), a multiplicity of stiffeners 110 (sometimes referred to as "stringers") which are attached to the frames, and a fuselage skin 108 which surrounds the frames. The fuselage skin 108 may be made of composite material, such as fiber-reinforced plastic. Typically such a composite fuselage skin 108 has ply pad-ups in window belts 112 and 114 on the sides of the fuselage 2 where crown cabin windows 24 and main cabin windows 34 are respectively located. These skin pad-ups increase the gauge of the skin to reinforce the windows and/or provide a base for mounting window frames.

Still referring to FIG. 21, the ends of each transverse bow floor beam 71 are attached to opposite sides of a respective frame 78 of the fuselage 2 by means of respective upper floor beam fittings 116 (only one of which is depicted in FIG. 21). More specifically, each upper floor beam fitting 116 is provided with two sets of holes arranged in respective patterns, while the transverse bow floor beam 71 is provided with a set of holes arranged in a pattern that matches the pattern of the first set of holes formed in the upper floor beam fitting 116 and the frame 78 is provided with a set of holes arranged in a pattern that matches the pattern of the second set of holes formed in the upper floor beam fitting 116. In accordance with one method of attachment, the end of the transverse bow floor beam 71 and the upper floor beam fitting 116 are positioned so that the first set of holes in the upper floor beam fitting 116 are aligned with the holes in the end of the transverse bow floor beam 71, bolts are inserted in the aligned holes, and then nuts are threaded onto the projecting ends of the bolts and tightened until the upper floor beam fitting 116 is adequately affixed to the transverse bow floor beam 71. Then the resulting assembly is positioned so that the second set of holes in the upper floor beam fitting 116 are aligned with the holes in the frame 78, bolts are inserted in the aligned holes, and then nuts are threaded onto the projecting ends of the bolts and tightened until the upper floor beam fitting 116 is adequately affixed to the frame 78. This process is repeated for each end of each transverse bow floor beam 71. In a similar manner, the transverse floor beams of the lower deck (not shown in FIG. 21), which separates the main cabin from the baggage/cargo hold, can be affixed to the frames 78 by means of main floor beam fittings 118.

After the transverse bow floor beams 71 have been attached to the frames 78, a multiplicity of honeycomb floor panels 76 can be laid on top of and attached to the transverse bow floor beams 71. Thereafter, the seat tracks are attached to the honeycomb floor panels 76 (only two seat tracks 60a and 60b are depicted in FIG. 21). The crown cabin passenger seats are installed by attaching them to the seat tracks.

The aircraft configurations disclosed above would have high fuel efficiency per seat and reduced aircraft-related operating cost per seat relative to prior double-deck aircraft having an equal number of seats.

Persons skilled in the art will appreciate that the construction of a fuselage in which a crown cabin is partly defined by an upper deck having a hanging floor structure will typically occur at a stage of production prior to the attachment of the wings to the fuselage. At that stage of the production cycle, the wingless structure is not yet an aircraft. The term "aircraft structure", as used in the appended claims, should be construed broadly to encompass a set of structures comprising fuselages in process and fuselages incorporated in completed aircraft.

In addition, in some cases it may be feasible to change the configuration of a one-passenger-deck aircraft to add a crown cabin by retrofitting. In accordance with some embodiments, a method of retrofitting an aircraft having a fuselage having an original semi-monocoque structure comprises: (a) removing a fuselage crown portion of the original semi-monocoque structure directly above the main cabin; (b) installing a substitute fuselage crown portion in place of the original fuselage crown portion, wherein the substitute fuselage crown portion comprises a cabin hanging floor structure and an upper semi-monocoque structure that define a crown cabin; and (c) installing a multiplicity of passenger seats in the crown cabin. The hanging floor structure would comprise a central portion extending along a length of the upper deck, a first angled portion connected to the central portion and attached to or integrally formed with a remainder of the original semi-monocoque structure or to the upper semi-monocoque structure at an elevation which is higher than an upper surface of the central portion, and a second angled portion connected to the central portion and attached to or integrally formed with the remainder of the original semi-monocoque structure or to the upper semi-monocoque structure at an elevation which is higher than the upper surface of the central portion of the upper deck, the central portion being structurally supported by the first and second angled portions. In accordance with one embodiment, step (b) comprises: attaching the first and second angled portions to the upper semi-monocoque structure to form a pre-assembled crown cabin unit; and attaching the pre-assembled crown cabin unit to the remainder of the original semi-monocoque structure.

While aircraft configurations have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. An aircraft structure comprising:
   a fuselage comprising lower and upper semi-monocoque structures;
   a lower deck disposed inside said fuselage and attached to said lower semi-monocoque structure, said lower deck and said lower semi-monocoque structure defining a space for storing at least one of baggage, bulk cargo and containerized cargo;
   an upper deck disposed inside said fuselage above said lower deck and attached to or integrally formed with at least one of said upper and lower semi-monocoque structures, said upper and lower decks and said lower semi-monocoque structure defining a main cabin, and said upper deck and said upper semi-monocoque structure defining a crown cabin;
   a first multiplicity of passenger seats supported by said lower deck and disposed in said main cabin; and
   a second multiplicity of passenger seats supported by said upper deck and disposed in said crown cabin,
   wherein said upper deck has a hanging floor structure comprising a plurality of transverse bow floor beams, each of said transverse bow floor beams comprising a central portion, a first angled portion connected to said central portion and attached to or integrally formed with said fuselage at an elevation which is higher than an upper surface of said central portion, and a second angled portion connected to said central portion and attached to or integrally formed with said fuselage at an elevation which is higher than said upper surface of said central portion, said central portion being structurally supported by said first and second angled portions.

2. The aircraft structure as recited in claim 1, wherein said first and second angled portions of said hanging floor structure are attached to or integrally formed with said upper semi-monocoque structure.

3. The aircraft structure as recited in claim 1, wherein said first and second angled portions of said hanging floor structure are attached to or integrally formed with said lower semi-monocoque structure.

4. The aircraft structure as recited in claim 1, wherein said crown cabin comprises a longitudinal aisle, and passenger seats of said second multiplicity of passenger seats are disposed on both sides of said longitudinal aisle.

5. The aircraft structure as recited in claim 4, wherein at least one row of passenger seats of said second multiplicity of passenger seats comprises first and second passenger seats disposed on one side of said longitudinal aisle, said first and second passenger seats being vertically staggered relative to each other.

6. The aircraft structure as recited in claim 4, wherein at least one row of passenger seats of said second multiplicity of passenger seats comprises first and second passenger seats disposed on one side of said longitudinal aisle, said first and second passenger seats being horizontally staggered relative to each other.

7. The aircraft structure as recited in claim 6, wherein said first passenger seat faces substantially forward and said second passenger seat faces substantially aft.

8. The aircraft structure as recited in claim 4, wherein at least one row of passenger seats of said second multiplicity of passenger seats comprises first and second passenger seats disposed on opposite sides of said longitudinal aisle, said first and second passenger seats facing inward at respective acute angles relative to said longitudinal aisle.

9. The aircraft structure as recited in claim 4, wherein at least one row of passenger seats of said second multiplicity of passenger seats comprises first and second passenger seats disposed on opposite sides of said longitudinal aisle, said first and second passenger seats facing outward at respective acute angles relative to said longitudinal aisle.

10. The aircraft structure as recited in claim 1, wherein said lower semi-monocoque structure and said upper semi-monocoque structure each comprise a combination of a load-carrying skin member as well as additional structural members comprising at least one of stiffeners, longerons, stringers, sandwich core elements, frames, ribs, bulkheads, isogrid members and orthogrid members.

11. The aircraft structure as recited in claim 1, wherein said hanging floor structure further comprises transverse floor beams attached to said transverse bow floor beams.

12. The aircraft structure as recited in claim 1, wherein said hanging floor structure comprises upper and lower facesheets and a core therebetween.

13. An aircraft structure comprising:
   a fuselage comprising a semi-monocoque structure;
   a lower deck disposed inside said fuselage and attached to said semi-monocoque structure, said lower deck and said semi-monocoque structure defining a storage space;
   an upper deck disposed inside said fuselage above said lower deck and attached to or integrally formed with said semi-monocoque structure, said upper and lower decks and said semi-monocoque structure defining a main cabin, and said upper deck and said semi-monocoque structure defining a crown cabin;

a first multiplicity of passenger seats supported by said lower deck and disposed in said main cabin; and a second multiplicity of passenger seats supported by said upper deck and disposed in said crown cabin, wherein said upper deck has a hanging floor structure comprising a plurality of transverse bow floor beams, each of said transverse bow floor beams comprising a central portion, a first angled portion connected to said central portion and attached to or integrally formed with said semi-monocoque structure at an elevation which is higher than an upper surface of said central portion, and a second angled portion connected to said central portion and attached to or integrally formed with said semi-monocoque structure at an elevation which is higher than said upper surface of said central portion, said central portion being structurally supported by said first and second angled portions.

14. The aircraft structure as recited in claim 13, wherein said semi-monocoque structure comprises a lower semi-monocoque structure attached to an upper semi-monocoque structure, and said first and second angled portions of said hanging floor structure are attached to or integrally formed with said upper semi-monocoque structure.

15. The aircraft structure as recited in claim 13, wherein said semi-monocoque structure comprises a lower semi-monocoque structure attached to an upper semi-monocoque structure, and said first and second angled portions of said hanging floor structure are attached to or integrally formed with said lower semi-monocoque structure.

16. The aircraft structure as recited in claim 1, further comprising a plurality of pairs of upper floor beam fittings, wherein respective ends of said first and second angled portions of each transverse bow floor beam are attached to said upper semi-monocoque structure by respective upper floor beam fittings of a respective pair of upper floor beam fittings.

17. The aircraft structure as recited in claim 13, further comprising a plurality of pairs of upper floor beam fittings, wherein respective ends of said first and second angled portions of each transverse bow floor beam are attached to said lower semi-monocoque structure by respective upper floor beam fittings of a respective pair of upper floor beam fittings.

18. The aircraft structure as recited in claim 1, wherein at least some of said first multiplicity of passenger seats are disposed directly below a longitudinal centerline of said hanging floor structure.

19. The aircraft structure as recited in claim 13, wherein at least some of said first multiplicity of passenger seats are disposed directly below a longitudinal centerline of said hanging floor structure.

\* \* \* \* \*